United States Patent
Shahana

(10) Patent No.: US 11,952,081 B2
(45) Date of Patent: Apr. 9, 2024

(54) CONTROL DEVICE FOR HUMAN-POWERED VEHICLE

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/366,407

(22) Filed: Aug. 7, 2023

(65) Prior Publication Data

US 2024/0083543 A1  Mar. 14, 2024

(30) Foreign Application Priority Data

Sep. 9, 2022 (JP) .................................. 2022-144036

(51) Int. Cl.
| | |
|---|---|
| *B62M 9/123* | (2010.01) |
| *B62M 9/122* | (2010.01) |
| *B62M 9/124* | (2010.01) |

(52) U.S. Cl.
CPC ............ *B62M 9/123* (2013.01); *B62M 9/122* (2013.01); *B62M 9/124* (2013.01)

(58) Field of Classification Search
CPC ....... B62M 9/123; B62M 9/122; B62M 9/124
See application file for complete search history.

(56) References Cited

U.S. PATENT DOCUMENTS

| | | | |
|---|---|---|---|
| 10,562,533 B2* | 2/2020 | Tsuchizawa | ............ B60W 10/11 |
| 2015/0307157 A1* | 10/2015 | Gao | ........................ B62M 6/45 |
| | | | 701/52 |
| 2022/0204126 A1* | 6/2022 | Shahana | .................. B62M 6/45 |

FOREIGN PATENT DOCUMENTS

| | | |
|---|---|---|
| JP | 2013-47085 A | 3/2013 |
| JP | 2014-151745 A | 8/2014 |
| JP | 2021-187303 A | 12/2021 |

* cited by examiner

*Primary Examiner* — Justin Holmes
(74) *Attorney, Agent, or Firm* — Global IP Counselors, LLP

(57) ABSTRACT

A human-powered vehicle control device includes an electronic controller that controls a transmission to shift a ratio of a rotational speed of a wheel to a rotational speed of a crank axle in accordance with a control state. In a case where the controller controls the transmission to shift the ratio in accordance with an input from a shift operation device in a first control state, the controller changes the control state to a second control state. In a case where a change amount of a parameter related to a vehicle state of the human-powered vehicle becomes a predetermined amount or greater in the second control state, the controller changes the control state to the first control state. Shifting of the ratio in accordance with a shifting condition is more restricted in the second control state than the first control state.

18 Claims, 5 Drawing Sheets

CONTROL DEVICE FOR HUMAN-POWERED VEHICLE

CROSS-REFERENCE TO RELATED APPLICATIONS

This application claims priority to Japanese Patent Application No. 2022-144036, filed on Sep. 9, 2023. The entire disclosure of Japanese Patent Application No. 2022-144036 is hereby incorporated herein by reference.

BACKGROUND

Technical Field

The present disclosure generally relates to a control device for a human-powered vehicle.

Background Information

One example of a control device for a human-powered vehicle is disclosed in Japanese Laid-Open Patent Publication No. 2014-151745 (Patent Document 1). The control device of Patent Document 1 is configured to control a transmission.

SUMMARY

An object of the present disclosure is to provide a control device for a human-powered vehicle that controls a transmission in a preferred manner.

A control device in accordance with a first aspect of the present disclosure is for a human-powered vehicle. The control device comprises an electronic controller configured to control a transmission that shifts a ratio of a rotational speed of a wheel of the human-powered vehicle to a rotational speed of a crank axle of the human-powered vehicle in accordance with a control state. The electronic controller is configured to select the control state from either one of a first control state and a second control state. The electronic controller is configured to control the transmission so that the transmission shifts the ratio in accordance with a shifting condition and an input from a shift operation device that is operable by a user. In a case where the electronic controller controls the transmission so as to shift the ratio in accordance with an input from the shift operation device in the first control state, the electronic controller is configured to switch the control state from the first control state to the second control state. In a case where a change amount of a parameter related to a vehicle state of the human-powered vehicle becomes greater than or equal to a predetermined amount in the second control state, the electronic controller is configured to switch the control state from the second control state to the first control state. Shifting of the ratio in accordance with the shifting condition is more restricted in the second control state than the first control state.

With the control device according to the first aspect, in a case where the transmission is controlled to shift the ratio in accordance with an input from the shift operation device, shifting of the ratio is restricted until the change amount of the parameter related to the vehicle state becomes greater than or equal to the predetermined amount. This controls the transmission in a preferred manner. With the control device according to the first aspect, in a case where the transmission is controlled to shift the ratio in accordance with an input from the shift operation device, the restriction on shifting of the ratio is canceled in a case where the change amount of the parameter related to the vehicle state becomes greater than or equal to the predetermined amount. This optimally controls the transmission in accordance with the shifting condition.

In accordance with a second aspect of the present disclosure, the control device according to the first aspect is configured so that the parameter includes at least one of a vehicle speed and an acceleration of the vehicle speed.

The control device according to the second aspect restricts shifting of the ratio until the change amount of at least one of vehicle speed and acceleration of the vehicle speed becomes greater than or equal to the predetermined amount.

In accordance with a third aspect of the present disclosure, the control device according to the first or second aspect is configured so that the parameter includes a rotational amount of the crank axle. The predetermined amount includes a predetermined rotational amount set in accordance with the ratio.

The control device according to the third aspect restricts shifting of the ratio until the rotational amount of the crank axle becomes greater than or equal to the predetermined rotational amount.

In accordance with a fourth aspect of the present disclosure, the control device according to any one of the first to third aspects is configured so that the parameter includes a gradient of a road traveled by the human-powered vehicle.

The control device according to the fourth aspect restricts shifting of the ratio until the change amount of the road gradient becomes greater than or equal to the predetermined amount.

In accordance with a fifth aspect of the present disclosure, the control device according to any one of the first to fourth aspects is configured so that the parameter includes a human driving force input to the human-powered vehicle.

The control device according to the fifth aspect restricts shifting of the ratio until the change amount of the human driving force becomes greater than or equal to the predetermined amount.

In accordance with a sixth aspect of the present disclosure, the control device according to any one of the first to fifth aspects is configured so that the parameter includes at least one of a rotational amount of the wheel of the human-powered vehicle and a distance traveled by the human-powered vehicle.

The control device according to the sixth aspect restricts shifting of the ratio until the change amount of at least one of the rotational amount of the wheel of the human-powered vehicle and the distance traveled by the human-powered vehicle becomes greater than or equal to the predetermined amount.

In accordance with a seventh aspect of the present disclosure, the control device according to any one of the first to sixth aspects is configured so that the parameter includes the rotational speed of the crank axle.

The control device according to the seventh aspect restricts shifting of the ratio until the change amount of the rotational speed of the crank axle becomes greater than or equal to the predetermined amount.

In accordance with an eighth aspect of the present disclosure, the control device according to any one of the first to seventh aspects is configured so that in at least one of a case where a vehicle speed accelerates and exceeds a first vehicle speed and a case where the vehicle speed decelerates and becomes less than a second vehicle speed in the second control state, the electronic controller is configured to switch the control state from the second control state to the first control state.

The control device according to the eighth aspect restricts shifting of the ratio until at least one of a case where the vehicle speed accelerates and exceeds the first vehicle speed and a case where the vehicle speed decelerates and becomes less than the second vehicle speed.

In accordance with a ninth aspect of the present disclosure, the control device according to any one of the first to eighth aspects is configured so that in a case where a predetermined shifting condition that differs from the shifting condition is satisfied in the second control state, the electronic controller is configured to switch the control state from the second control state to the first control state.

The control device according to the ninth aspect restricts shifting of the ratio until the predetermined shifting condition is satisfied.

A control device in accordance with a tenth aspect of the present disclosure is for a human-powered vehicle. The control device comprises an electronic controller configured to control a transmission that shifts a ratio of a rotational speed of a wheel of the human-powered vehicle to a rotational speed of a crank axle of the human-powered vehicle in accordance with a control state. The electronic controller is configured to select the control state from either one of a first control state or a second control state. The electronic controller is configured to control the transmission so that the transmission shifts the ratio in accordance with a shifting condition and an input from a shift operation device that is operable by a user. In a case where the electronic controller controls the transmission so as to shift the ratio in accordance with an input from the shift operation device in the first control state, the electronic controller is configured to switch the control state from the first control state to the second control state. In at least one of a case where a vehicle speed accelerates and exceeds a first vehicle speed and a case where the vehicle speed decelerates and becomes less than a second vehicle speed in the second control state, the electronic controller is configured to switch the control state from the second control state to the first control state. Shifting of the ratio in accordance with the shifting condition is more restricted in the second control state than the first control state.

With the control device according to the tenth aspect, in a case where the transmission is controlled to shift the ratio in accordance with an input from the shift operation device, shifting of the ratio is restricted until at least one of a case where the vehicle speed accelerates and exceeds the first vehicle speed and a case where the vehicle speed decelerates and becomes less than the second vehicle speed. This controls the transmission in a preferred manner. With the control device according to the tenth aspect, in a case where the transmission is controlled to shift the ratio in accordance with an input from the shift operation device, the restriction on shifting of the ratio is canceled in at least one of a case where the vehicle speed accelerates and exceeds the first vehicle speed and a case where the vehicle speed decelerates and becomes less than the second vehicle speed. This optimally controls the transmission in accordance with the shifting condition.

In accordance with an eleventh aspect of the present disclosure, the control device according to any one of the first to tenth aspects is configured so that the shifting condition is related to at least one of a traveling state of the human-powered vehicle and a traveling environment of the human-powered vehicle.

The control device according to the eleventh aspect controls the transmission in accordance with at least one of the traveling state of the human-powered vehicle and the traveling environment of the human-powered vehicle.

In accordance with a twelfth aspect of the present disclosure, the control device according to any one of the first to eleventh aspects is configured so that the shifting condition includes at least one of the rotational speed of the crank axle, a human driving force input to the human-powered vehicle, and vehicle speed.

The control device according to the twelfth aspect controls the transmission in accordance with at least one of the rotational speed of the crank axle, human driving force, and vehicle speed.

In accordance with a thirteenth aspect of the present disclosure, the control device according to any one of the first to twelfth aspects is configured so that the shifting condition includes the rotational speed of the crank axle. The electronic controller is configured to control the transmission so that the transmission increases the ratio in a case where the rotational speed of the crank axle is greater than an upper limit threshold value. The electronic controller is configured to control the transmission so that the transmission decreases the ratio in a case where the rotational speed of the crank axle is less than a lower limit threshold value.

The control device according to the thirteenth aspect controls the transmission so that the transmission increases the ratio in a case where the rotational speed of the crank axle is greater than the upper limit threshold value, and so that the transmission decreases the ratio in a case where the rotational speed of the crank axle is less than the lower limit threshold value.

In accordance with a fourteenth aspect of the present disclosure, the control device according to any one of the first to thirteenth aspects is configured so that in a case where the electronic controller controls the transmission so that the ratio is shifted in one of an increasing manner and a decreasing manner in accordance with an input from the shift operation device in the first control state, the electronic controller is configured to switch the control state from the first control state to the second control state. Shifting of the ratio in the other one of the increasing manner and the decreasing manner in accordance with the shifting condition is more restricted in the second control state than the first control state.

With the control device according to the fourteenth aspect, shifting of the ratio in accordance with the shifting condition in a direction opposite the direction in which the user operates the shift operation device is more restricted in the second control state than the first control state.

The control device for a human-powered vehicle according to the present disclosure controls the transmission in a preferred manner.

BRIEF DESCRIPTION OF THE DRAWINGS

Referring now to the attached drawings which form a part of this original disclosure.

DETAILED DESCRIPTION

Figure 1:
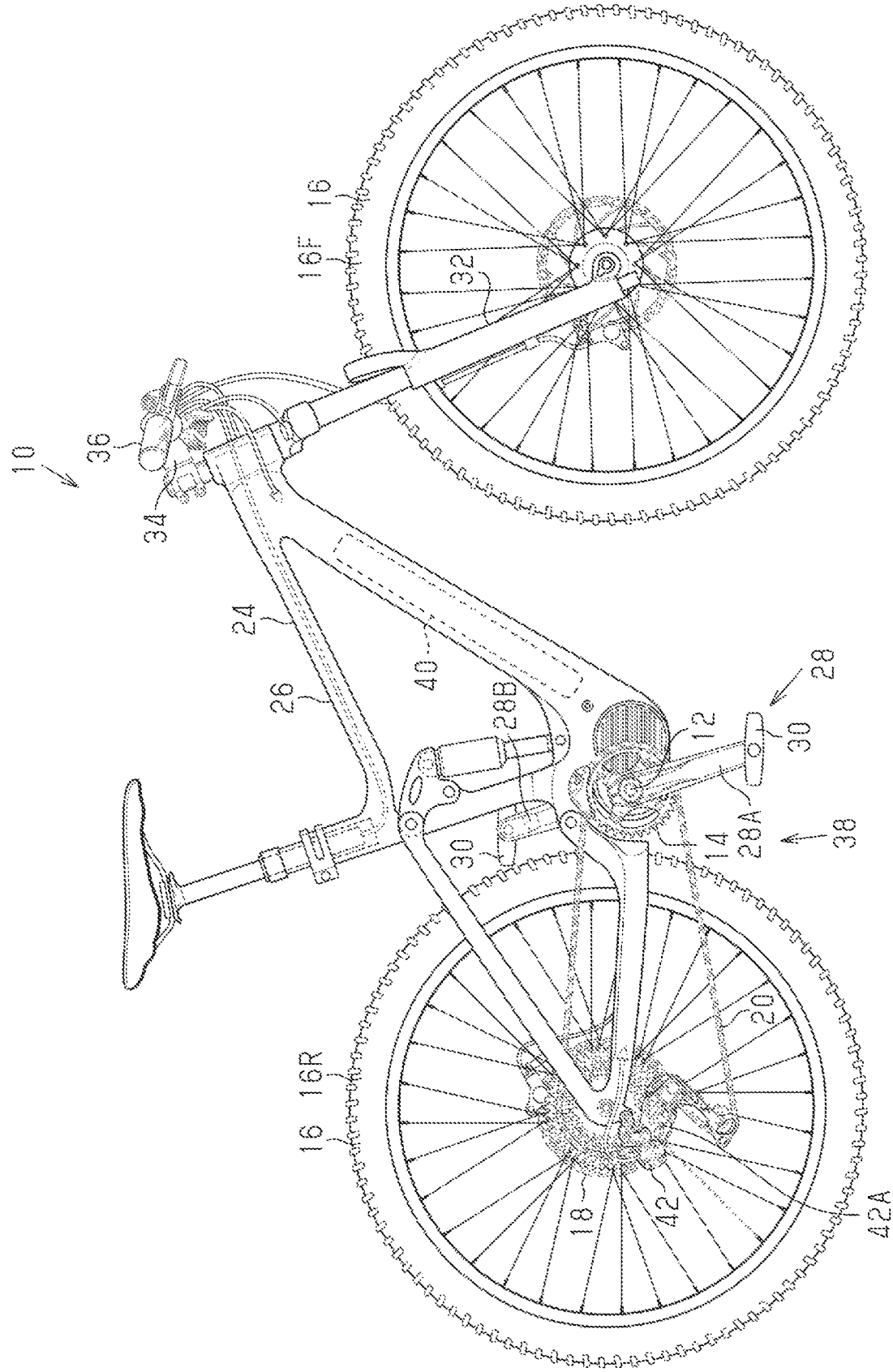
FIG. 1 is a side elevational view of a human-powered vehicle including a human-powered vehicle control device for the human-powered vehicle in accordance with an embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

A human-powered vehicle control device 60 (hereinafter referred to simply as the control device 60) for a human-powered vehicle will now be described with reference to FIGS. 1 to 4. A human-powered vehicle is a vehicle that has at least one wheel and can be driven by at a least human power. Examples of the human-powered vehicle include various types of bicycles such as a mountain bike, a road bike, a city bike, a cargo bike, a handcycle, and a recumbent bike. There is no limit to the number of wheels of the human-powered vehicle. The human-powered vehicle also includes, for example, a unicycle or a vehicle having two or more wheels. The human-powered vehicle is not limited to a vehicle that can be driven only by a human driving force. The human-powered vehicle includes an electric bicycle (E-bike) that uses a drive force of an electric motor for propulsion in addition to the human driving force. The E-bike includes an electric assist bicycle that assists in propulsion with an electric motor. In the embodiment described hereafter, the human-powered vehicle will be described as a bicycle.

A human-powered vehicle 10 includes a crank axle 12, a first rotational body 14, a wheel 16, a second rotational body 18, and a transmission body 20. The crank axle 12 is configured to receive a human driving force. The first rotational body 14 is coupled to the crank axle 12. The second rotational body 18 is coupled to the wheel 16. The transmission body 20 is engaged with the first rotational body 14 and the second rotational body 18 and is configured to transmit a driving force between the first rotational body 14 and the second rotational body 18.

The human-powered vehicle 10 further includes, for example, a vehicle body 24. The vehicle body 24 includes, for example, a frame 26. The wheel 16 includes, for example, a front wheel 16F and a rear wheel 16R. The crank axle 12 is, for example, rotatable relative to the frame 26. The human-powered vehicle 10 includes, for example, a crank 28. The crank 28 includes the crank axle 12 and two crank arms 28A and 28B. For example, the crank arm 28A is provided on a first axial end of the crank axle 12, and the crank arm 28B is provided on a second axial end of the crank axle 12. The human-powered vehicle 10 includes, for example, two pedals 30. For example, one of the two pedals 30 is coupled to the crank arm 28A. The other one of the two pedals 30 is coupled to the crank arm 28B. For example, the rear wheel 16R is driven by rotation of the crank axle 12. For example, the rear wheel 16R is supported by the frame 26.

The front wheel 16F is attached to the frame 26 by a front fork 32. A handlebar 36 is connected to the front fork 32 by a stem 34.

The human-powered vehicle 10 further includes, for example, a drive mechanism 38. For example, at least one of the front wheel 16F and the rear wheel 16R is connected to the crank 28 by the drive mechanism 38. In the present embodiment, the rear wheel 16R is connected to the crank 28 by the drive mechanism 38.

The drive mechanism 38 includes, for example, at least one first rotational body 14, at least one second rotational body 18, and the transmission body 20. The at least one first rotational body 14 is coupled to the crank axle 12. The at least one second rotational body 18 is coupled to the wheel 16. The transmission body 20 is engaged with the at least one first rotational body 14 and the at least one second rotational body 18 and is configured to transmit driving force between the at least one first rotational body 14 and the at least one second rotational body 18. For example, the transmission body 20 transmits the rotational force of the at least one first rotational body 14 to the at least one second rotational body 18.

The at least one first rotational body 14 is, for example, arranged coaxially with the crank axle 12. The at least one first rotational body 14 does not have to be arranged coaxially with the crank axle 12. In a case where the at least one first rotational body 14 is not arranged coaxially with the crank axle 12, for example, the at least one first rotational body 14 is coupled to the crank axle 12 by a first transmission mechanism. The first transmission mechanism can include a set of gears, a set of sprockets and a chain, a set of pulleys and a belt, or a set of shafts and bevel gears. The at least one first rotational body 14 includes, for example, at least one first sprocket.

The at least one second rotational body 18 is, for example, arranged coaxially with the rear wheel 16R. The at least one second rotational body 18 does not have to be arranged coaxially with the rear wheel 16R. In a case where the at least one second rotational body 18 is not arranged coaxially with the rear wheel 16R, for example, the at least one second rotational body 18 is coupled to the rear wheel 16R by a second transmission mechanism. The second transmission mechanism can include a set of gears, a set of sprockets and a chain, a set of pulleys and a belt, or a set of shafts and bevel gears. The at least one second rotational body 18 includes, for example, at least one second sprocket.

The at least one second rotational body 18 is coupled to the rear wheel 16R by a one-way clutch. The third one-way clutch includes, for example, at least one of a roller clutch, a sprag clutch, and a ratchet clutch. The third one-way clutch is configured to transmit driving force from the second rotational body 18 to the rear wheel 16R in a case where the second rotational body 18 is rotated in accordance with the forward rotation of the first rotational body 14. Further, the third one-way clutch is configured to allow relative rotation of the rear wheel 16R and the second rotational body 18 in a case where the speed at which the rear wheel 16R is rotated forward is greater than the speed at which the second rotational body 18 is rotated forward.

The human-powered vehicle 10 further includes, for example, a battery 40. The battery 40 includes one or more battery cells. Each battery cell includes a rechargeable battery. For example, the battery 40 is configured to supply electric power to the control device 60 and a transmission 42. For example, the battery 40 is connected to the control device 60 in a manner allowing for wired communication or wireless communication. The battery 40 is configured to establish communication with the control device 60 through, for example, power line communication (PLC), Controller Area Network (CAN), or universal asynchronous receiver/transmitter (UART).

The human-powered vehicle 10 further includes, for example, the transmission 42. The transmission 42 shifts a ratio R of a rotational speed of the wheel 16 of the human-powered vehicle 10 to a rotational speed of the crank axle 12 of the human-powered vehicle 10 in accordance with a control state. For example, the transmission 42 is provided in a transmission path of the human driving force in the human-powered vehicle 10 and is configured to shift the ratio R. For example, the ratio R is a ratio of the rotational speed of the wheel 16 to a rotational speed of the crank 28. The rotational speed of the wheel 16 includes, for example, the rotational speed of the drive wheel.

The transmission 42 includes, for example, at least one of a derailleur 42A and an internal transmission. The human-powered vehicle 10 of the present embodiment further includes the derailleur 42A. The transmission 42 of the present embodiment includes the derailleur 42A. The derailleur 42A is configured to operate the transmission body 20 and shift the ratio R of the rotational speed of the wheel 16 to the rotational speed of the crank axle 12. The derailleur 42A includes, for example, at least one of a front derailleur and a rear derailleur. In a case where the derailleur 42A includes at least one of a front derailleur and a rear derailleur, the transmission body 20 includes a chain.

The derailleur 42A moves, for example, the transmission body 20 from a position engaged with one sprocket to a position engaged with another sprocket. In a case where the transmission 42 includes an internal transmission, for example, the internal transmission is provided in a hub of the rear wheel 16R. The internal transmission can include a continuously variable transmission (CVT). The transmission 42 includes, for example, an electric actuator 42B. The electric actuator 42B is, for example, configured to actuate the transmission 42. The electric actuator 42B is, for example, configured to actuate the derailleur 42A.

The derailleur 42A is configured to operate the transmission body 20 and shift the ratio R of the rotational speed of the wheel 16 to the rotational speed of the crank axle 12. For example, the derailleur 42A is provided in the transmission path of the human driving force in the human-powered vehicle 10 and is configured to shift the ratio R. For example, the derailleur 42A operates the transmission body 20 and changes the engagement state between at least one of the at least one first rotational body 14 and the at least one second rotational body 18 and the transmission body 20 to shift the ratio R. The relationship of the ratio R, the rotational speed of the wheel 16, and the rotational speed of the crank axle 12 satisfies Equation (1). In Equation (1), the term "R" represents the ratio R. In Equation (1), the term "W" represents the rotational speed of the wheel 16. In Equation (1), the term "C" represents the rotational speed of the crank axle 12.

$$R = W \text{ (rpm)}/C \text{ (rpm)} \qquad \text{Equation (1):}$$

The derailleur 42A can shift the ratio R in accordance with, for example, at least one transmission stage. For example, the derailleur 42A is configured to operate the transmission body 20 and shift the at least one transmission stage. For example, the at least one transmission stage is set in accordance with at least one of the at least one first rotational body 14 and the at least one second rotational body 18. In a case where the at least one transmission stage includes a plurality of transmission stages, for example, a different ratio R is set to each transmission stage. For example, the ratio R becomes greater as the transmission stage increases.

In an example in which the at least one first rotational body 14 includes multiple first rotational bodies 14 and the at least one second rotational body 18 includes multiple second rotational bodies 18, the transmission stage is set in accordance with a combination of one of the first rotational bodies 14 and one of the second rotational bodies 18. In an example in which the at least one first rotational body 14 includes a single first rotational body 14 and the at least one second rotational body 18 includes multiple second rotational bodies 18, the transmission stage is set in accordance with the number of the second rotational bodies 18. In an example in which the at least one first rotational body 14 includes multiple first rotational bodies 14 and the at least one second rotational body 18 includes a single second rotational body 18, the transmission stage is set in accordance with the number of the first rotational bodies 14.

The derailleur 42A moves, for example, the chain from a position engaged with one sprocket to a position engaged with another sprocket. For example, the combination of a first sprocket having the least teeth and a second sprocket having the most teeth corresponds to the smallest transmission stage obtainable by the derailleur 42A. For example, the combination of a first sprocket having the most teeth and a second sprocket having the least teeth corresponds to the largest transmission stage obtainable by the derailleur 42A.

In a case where the derailleur 42A includes a front derailleur, the first rotational bodies 14 include, for example, two or three first sprockets. The first rotational bodies 14 include, for example, two first sprockets.

In a case where the derailleur 42A includes a front derailleur, for example, the derailleur 42A is configured to move the transmission body 20 from one first rotational body 14 to another first rotational body 14 in a shifting operation. The front derailleur operates the transmission body 20 and changes the engagement state of the at least one first rotational body 14 and the transmission body 20 to shift the ratio R. The first rotational bodies 14 include, for example, the first sprockets.

In a case where the derailleur 42A includes a rear derailleur, the at least one second rotational body 18 includes second sprockets. The number of the second sprockets is between two and twenty, inclusive. The second rotational bodies 18 include, for example, twelve second sprockets.

The human-powered vehicle 10 further includes, for example, a shift operation device 44. The shift operation device 44 is, for example, provided on the handlebar 36. The shift operation device 44 includes, for example, a first operation unit for increasing the ratio R and a second operation unit for decreasing the ratio R.

Figure 2:
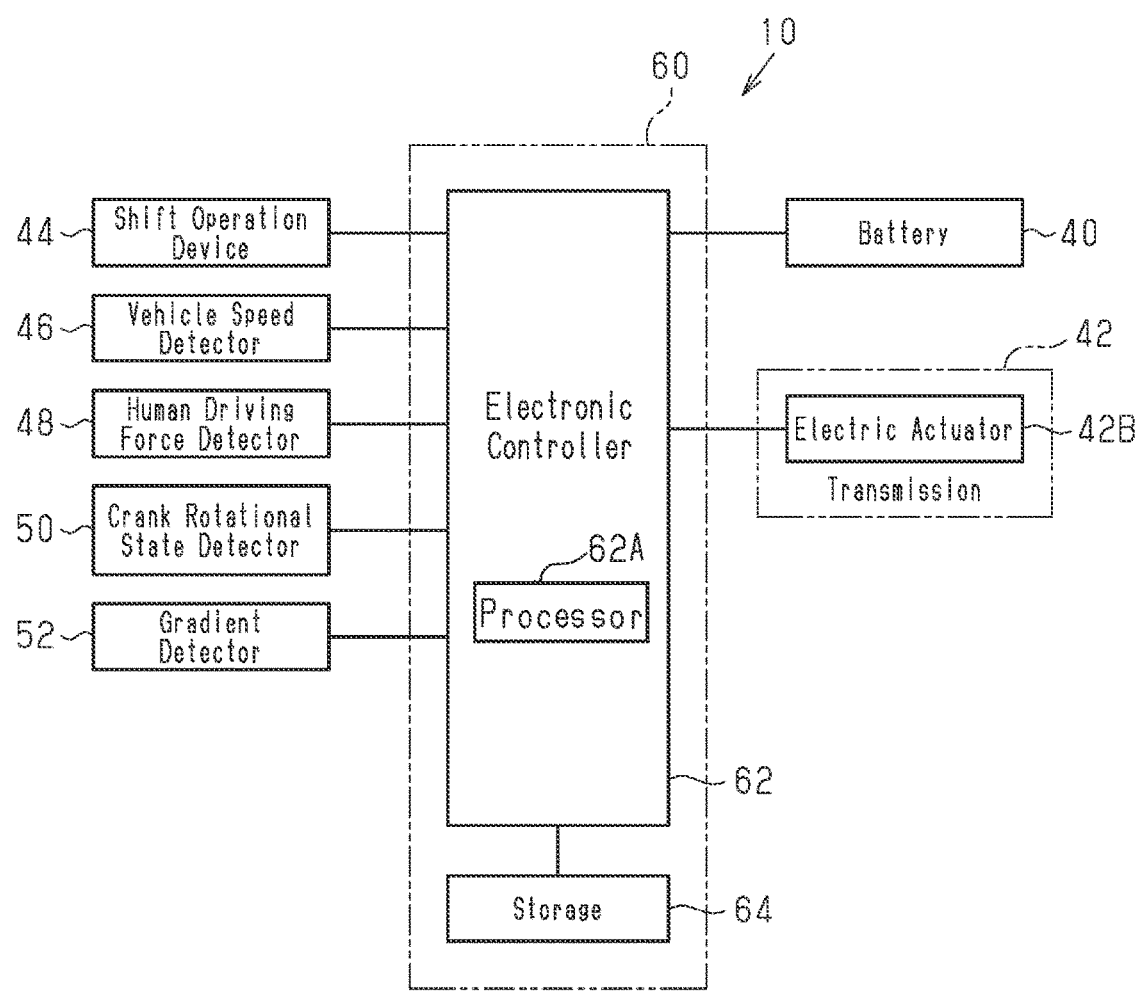
FIG. 2 is a block diagram showing the electrical configuration of the human-powered vehicle shown in FIG. 1.

As seen in FIG. 2, the human-powered vehicle 10 further includes one or more detectors for detecting one or more operating conditions of the human-powered vehicle 10. The term "detector" as used herein refers to a hardware device or instrument designed to detect the presence or absence of a particular event, object, substance, or a change in its environment, and to emit a signal in response. The term "detector" as used herein do not include a human being.

Also, as seen in FIG. 2, the human-powered vehicle 10 further includes an electronic controller 62. In particular, the control device 60 of the human-powered vehicle 10 includes the electronic controller 62. The electronic controller 62 is configured to receive input signals from various detectors as explained below.

The human-powered vehicle 10 further includes, for example, a vehicle speed detector 46. For example, the vehicle speed detector 46 is connected to the electronic controller 62 in a manner allowing for wired communication or wireless communication. The vehicle speed detector 46 is configured to detect, for example, information related to the speed of the human-powered vehicle 10. The vehicle speed detector 46 is configured to detect, for example, information related to the rotational speed of the wheel 16. The vehicle speed detector 46 is configured to detect, for example, a magnet provided on at least one of the front wheel 16F and the rear wheel 16R.

The vehicle speed detector 46 is, for example, configured to output a predetermined number of detection signals during a period in which the wheel 16 completes one rotation. The predetermined number is, for example, one. The vehicle speed detector 46 outputs, for example, a signal corresponding to the rotational speed of the wheel 16. The electronic controller 62 can calculate the speed of the human-powered vehicle 10 based on the signal corresponding to the rotational speed of the wheel 16 and information related to the circumferential length of the wheel 16. The information related to the circumferential length of the wheel 16 is stored in storage 64.

The human-powered vehicle 10 further includes, for example, a human driving force detector 48. The human driving force detector 48 is connected to the electronic controller 62 in a manner allowing for wired communication or wireless communication. The human driving force detector 48 is configured to output a signal corresponding to the torque applied to the crank axle 12 by a human driving force. The signal corresponding to the torque applied to the crank axle 12 by the human driving force includes information related to the human driving force input to the human-powered vehicle 10.

The human driving force detector 48 is, for example, provided on a member included in the transmission path of the human driving force or a member disposed near the member included in the transmission path of the human driving force. The member included in the transmission path of the human driving force includes, for example, the crank axle 12 and a member that transmits the human driving force between the crank axle 12 and the at least one first rotational body 14. For example, a power transmission portion is provided on an outer circumferential portion of the crank axle 12.

The human driving force detector 48 includes a strain sensor, a magnetostrictive sensor, a pressure sensor, or the like. A strain sensor includes a strain gauge. The human driving force detector 48 can have any configuration as long as information related to the human driving force is obtained.

The human driving force detector 48 can be provided on, for example, the crank arm 28A, the crank arm 28B, or at least one of the two pedals 30. In a case where the human driving force detector 48 is provided on at least one of the two pedals 30, the human driving force detector 48 can include, for example, a sensor that detects the pressure applied to the at least one of the two pedals 30. The human driving force detector 48 can be provided on, for example, the chain included in the transmission body 20. In a case where the human driving force detector 48 is provided on the chain, the human driving force detector 48 can include, for example, a sensor that detects the tension on the chain.

The human-powered vehicle 10 further includes, for example, a crank rotational state detector 50. For example, the crank rotational state detector 50 is connected to the electronic controller 62 in a manner allowing for wired communication or wireless communication. The crank rotational state detector 50 detects a rotational amount of at least one of the crank axle 12 and the at least one first rotational body 14. The crank rotational state detector 50 is configured to detect, for example, information corresponding to the rotational speed of the crank axle 12. The crank rotational state detector 50 is configured to detect, for example, information corresponding to a rotational speed of the at least one first rotational body 14. The information corresponding to the rotational speed of the crank axle 12 includes angular acceleration of the crank axle 12. The information corresponding to the rotational speed of the at least one first rotational body 14 includes an angular acceleration of the at least one first rotational body 14.

The crank rotational state detector 50 includes, for example, a magnetic sensor that outputs a signal corresponding to the strength of a magnetic field. The crank rotational state detector 50 includes a ring-shaped magnet having magnetic poles arranged in a circumferential direction. The ring-shaped magnet is provided on the crank axle 12, the at least one first rotational body 14, or a power transmission path extending from the crank axle 12 to the at least one first rotational body 14. The ring-shaped magnet includes, for example, one S-pole and one N-pole. The S-pole and the N-pole each continuously extend over 180° about the axis of the crank axle 12.

The crank rotational state detector 50 outputs, for example, a signal corresponding to at least one of the rotational speed of the crank axle 12 and the rotational speed of the at least one first rotational body 14. The crank rotational state detector 50 is, for example, configured to output a detection signal corresponding to a rotational angle of the crank axle 12 during a period in which at least one of the crank axle 12 and the at least one first rotational body 14 completes one rotation. The crank rotational state detector 50 can include an optical sensor, an acceleration sensor, a gyro sensor, a torque sensor, or the like, instead of the magnetic sensor.

The crank rotational state detector 50 is, for example, provided on the frame 26 of the human-powered vehicle 10. In a case where the crank rotational state detector 50 is provided on the frame 26, the crank rotational state detector 50 can include, for example, a vehicle speed sensor. In a case where the crank rotational state detector 50 includes a vehicle speed sensor, the electronic controller 62 can be configured to calculate the rotational speed of the crank axle 12 based on the speed detected by the vehicle speed sensor and the ratio R.

The crank rotational state detector 50 can be configured to detect a rotational amount of the at least one second rotational body 18. The crank rotational state detector 50 can be configured to detect information corresponding to a rotational speed of the at least one second rotational body 18. The information corresponding to the rotational speed of the at least one second rotational body 18 includes, for example, an angular acceleration of the at least one second rotational body 18. The crank rotational state detector 50 can output, for example, a signal corresponding to the rotational speed of the at least one second rotational body 18.

The human-powered vehicle 10 further includes, for example, a gradient detector 52. The gradient detector 52 includes, for example, at least one of an inclination sensor and a global positioning system (GPS) receiver. An inclination sensor includes, for example, at least one of a gyro sensor and an acceleration sensor. In a case where the gradient detector 52 includes a GPS receiver, map information including information related to a road gradient is stored in the storage 64 in advance, and the electronic controller 62 obtains the road gradient at the present location of the human-powered vehicle 10.

As mentioned above, the human-powered vehicle control device 60 for a human-powered vehicle includes the electronic controller 62. The electronic controller 62 is formed of one or more semiconductor chips that are mounted on a circuit board. Thus, the terms "electronic controller" and "controller" as used herein refers to hardware that executes a software program, and does not include a human being. The electronic controller 62 includes, for example, one or more processors 62A that execute predetermined control programs. Each of the processors 62A of the electronic controller 62 includes, for example, a central processing unit (CPU) or a micro-processing unit (MPU).

The processors 62A of the electronic controller 62 can be located at, for example, separate positions. For example, some of the processors 62A can be located on the human-powered vehicle 10, while other ones of the processors 62A can be located in a server connected to the internet. In a case where the processors are located at separate positions, the processors are connected to one another via a wireless communication device in a manner allowing for communication. The electronic controller 62 can include one or more microcomputers.

The control device 60 further includes, for example, the storage 64. The storage 64 is any computer storage device or any non-transitory computer-readable medium with the sole exception of a transitory, propagating signal. For example, the storage 64 is connected to the electronic controller 62 in a manner allowing for wired communication or wireless communication. The storage 64 stores, for example, control programs and information used for control processes. The storage 64 includes, for example, a non-volatile memory and a volatile memory. The non-volatile memory includes, for example, at least one of a read-only memory (ROM), an erasable programmable read-only memory (EPROM), an electrically erasable programmable read-only memory (EE-PROM), and a flash memory. The volatile memory includes, for example, a random-access memory (RAM).

The electronic controller 62 is configured to control the transmission 42. The electronic controller 62 is configured to control the transmission 42 so that the transmission 42 shifts the ratio R in accordance with a shifting condition and an input from the shift operation device 44 that is operable by a user. In an example in which the shifting condition is satisfied, the electronic controller 62 operates the transmission 42 and shifts the ratio R. In an example in which the shift operation device 44 is operated, the electronic controller 62 operates the transmission 42 and shifts the ratio R.

The shifting condition is related to, for example, at least one of a traveling state of the human-powered vehicle 10 and a traveling environment of the human-powered vehicle 10. The traveling state includes, for example, at least one of the rotational speed of the crank axle 12, the human driving force, and the vehicle speed. The traveling environment includes, for example, the gradient of a road traveled by the human-powered vehicle 10. At least one of the traveling state and the traveling environment includes, for example, traveling resistance. The traveling resistance includes, for example, at least one of air resistance, rolling resistance, gradient resistance, and acceleration resistance.

The shifting condition includes, for example, at least one of the rotational speed of the crank axle 12, the human driving force, and the vehicle speed. In the present embodiment, the shifting condition includes the rotational speed of the crank axle 12. For example, the electronic controller 62 is configured to control the transmission 42 so that the transmission 42 increases the ratio R in a case where the rotational speed of the crank axle 12 is greater than an upper limit threshold value. Further, the electronic controller 62 is configured to control the transmission 42 so that the transmission 42 decreases the ratio R in a case where the rotational speed of the crank axle 12 is less than a lower limit threshold value.

In a case where the shifting condition includes human driving force, for example, the shifting condition is satisfied if the human driving force is outside a first range. In a case where the shifting condition includes vehicle speed, for example, the shifting condition is satisfied if the vehicle speed is outside a second range.

The shifting condition includes, for example, at least one of the gradient of a road traveled by the human-powered vehicle 10 and the traveling resistance of the human-powered vehicle 10. In a case where the shifting condition includes the gradient of a road traveled by the human-powered vehicle 10, for example, the shifting condition is satisfied if the road gradient is outside a third range. In a case where the shifting condition includes the traveling resistance of the human-powered vehicle 10, for example, the shifting condition is satisfied if the traveling resistance is outside a fourth range.

The electronic controller 62 is configured to select the control state from either one of a first control state and a second control state. In a case where the electronic controller 62 controls the transmission 42 so as to shift the ratio R in accordance with an input from the shift operation device 44 in the first control state, the electronic controller 62 is configured to switch the control state from the first control state to the second control state. In a case where a change amount of a parameter related to a vehicle state of the human-powered vehicle 10 becomes greater than or equal to a predetermined amount in the second control state, the electronic controller 62 is configured to switch the control state from the second control state to the first control state. Shifting of the ratio R in accordance with the shifting condition is more restricted in the second control state than the first control state.

The electronic controller 62 can include an automatic mode and a manual mode. In a case where controller 62 selects the automatic mode, the electronic controller 62 controls the transmission 42 in accordance with both an input from the shift operation device 44 and the shifting condition. In a case where the electronic controller 62 selects the manual mode, the electronic controller 62 controls the transmission 42 in accordance with an input from the shift operation device 44 and does not control the transmission 42 in accordance with the shifting condition. In a case where the electronic controller 62 includes the automatic mode and the manual mode, the first and second control states are control states of the automatic mode.

In an example in which the electronic controller 62 controls the transmission 42 so that the ratio R is shifted in one of an increasing manner and a decreasing manner in accordance with an input from the shift operation device 44 in the first control state, the electronic controller 62 is configured to switch the control state from the first control state to the second control state. For example, shifting of the ratio R in the other one of the increasing manner and the decreasing manner in accordance with the shifting condition is more restricted in the second control state than the first control state. For example, shifting of the ratio R in the one of the increasing manner and the decreasing manner in accordance with the shifting condition is allowed in the second control state in the same manner as the first control state. Shifting of the ratio R in the one of the increasing manner and the decreasing manner in accordance with the shifting condition can be more restricted in the second control state than the first control state.

In an example in which the electronic controller 62 controls the transmission 42 so that the ratio R is shifted in the increasing manner in accordance with an input from the shift operation device 44 in the first control state, shifting of the ratio R in the decreasing manner in accordance with the shifting condition is more restricted in the second control state than the first control state. In an example in which the electronic controller 62 controls the transmission 42 so that the ratio R is shifted in the decreasing manner in accordance with an input from the shift operation device 44 in the first control state, shifting of the ratio R in the increasing manner in accordance with the shifting condition is more restricted in the second control state than the first control state.

In an example, the electronic controller 62 restricts shifting of the ratio R by changing the shifting condition. The electronic controller 62 restricts shifting of the ratio R by changing, for example, the range included in the shifting condition. In a case where the shifting condition includes the rotational speed of the crank axle 12, for example, the electronic controller 62 decreases the lower limit threshold value to restrict shifting of the ratio R in the decreasing manner. In a case where the shifting condition includes the rotational speed of the crank axle 12, for example, the electronic controller 62 increases the upper limit threshold value to restrict shifting of the ratio R in the increasing manner. The shifting condition includes, for example, a first condition and a second condition. For example, the electronic controller 62 controls the transmission 42 in accordance with the first condition in the first control state. For example, the electronic controller 62 controls the transmission 42 in accordance with the second condition in the second control state. The second condition is more difficult to satisfy than the first condition. For example, the range included in the second condition is wider than the range included in the first condition, and thus the second condition is more difficult to satisfy than the first condition. In a case where the electronic controller 62 restricts shifting of the ratio R, the electronic controller 62 can prohibit shifting of the ratio R without changing the range included in the shifting condition.

The parameter is, for example, a value that allows for determination of stability of the vehicle state, which changes in accordance with shifting of the ratio R. The change amount of the parameter is set based on, for example, a value indicating change in parameter from when the ratio R is shifted to when the vehicle state stabilizes.

The parameter includes, for example, at least one of the vehicle speed and the acceleration of the vehicle speed. In a case where the parameter includes vehicle speed, for example, the predetermined amount is between 1 km/h and 10 km/h, inclusive. In a case where the parameter includes the vehicle speed, for example, the predetermined amount is 5 km/h. In a case where the parameter includes acceleration, for example, the predetermined amount is between 1 km/h/s and 5 km/h/s, inclusive. In a case where the parameter includes acceleration, for example, the predetermined amount is 2 km/h/s.

In an example, the parameter includes a rotational amount of the crank axle 12, and the predetermined amount includes a predetermined rotational amount set in accordance with the ratio R. The rotational amount of the crank axle 12 can be represented by a stroke amount of the pedal 30. Table 1 shows the relationship of the transmission stage and the predetermined amount corresponding to a pedal stroke amount in a case where the number of transmission stages is twelve.

TABLE 1

| | Transmission Stage | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Predetermined Amount | 1260 Degrees | | | | 900 Degrees | | | | 540 Degrees | | | |

The parameter includes, for example, the gradient of a road traveled by the human-powered vehicle 10. For example, the road gradient is represented by an inclination angle. In a case where the parameter includes the road gradient, for example, the predetermined amount is between 2% and 10%, inclusive. In a case where the parameter includes the road gradient, for example, the predetermined amount is 5%. In a case where the road gradient is greater than or equal to 10 degrees, the electronic controller 62 can be configured to switch the control state from the second control state to the first control state regardless of the change amount of the parameter.

The parameter includes, for example, the human driving force input to the human-powered vehicle 10. In a case where the parameter includes the human driving force, the predetermined amount can differ between a case where the ratio R is shifted in the increasing manner in accordance with an operation of the shift operation device 44 and a case where the ratio R is shifted in the decreasing manner in accordance with an operation of the shift operation device 44. In a case where the ratio R is shifted in the increasing manner in accordance with an operation of the shift operation device 44, the electronic controller 62 can be configured to switch the control state from the second control state to the first control state regardless of the change amount of the parameter if the human driving force is greater than or equal to a determination driving force. For example, the determination driving force is between 30 Nm and 50 Nm, inclusive. For example, the determination driving force is 40 Nm.

The parameter includes, for example, at least one of a rotational amount of the wheel 16 of the human-powered vehicle 10 and a distance traveled by the human-powered vehicle 10.

The parameter includes, for example, the rotational speed of the crank axle 12. In a case where the parameter includes the rotational speed of the crank axle 12, for example, the predetermined amount is between 10 rpm and 30 rpm, inclusive. In a case where the parameter includes the rotational speed of the crank axle 12, for example, the predetermined amount is 20 rpm.

In at least one of a case where the vehicle speed accelerates and exceeds a first vehicle speed and a case where the vehicle speed decelerates and becomes less than a second vehicle speed in the second control state, for example, the electronic controller 62 is configured to switch the control state from the second control state to the first control state. The first vehicle speed is, for example, between 20 km/h and 40 km/h, inclusive. The first vehicle speed is, for example, 30 km/h. The second vehicle speed is, for example, between 0 km/h and 20 km/h, inclusive. The second vehicle speed is, for example, 10 km/h. In an example in which the human-powered vehicle 10 is stopped in the second control state, the electronic controller 62 can be configured to switch the control state from the second control state to the first control state.

Figure 3:
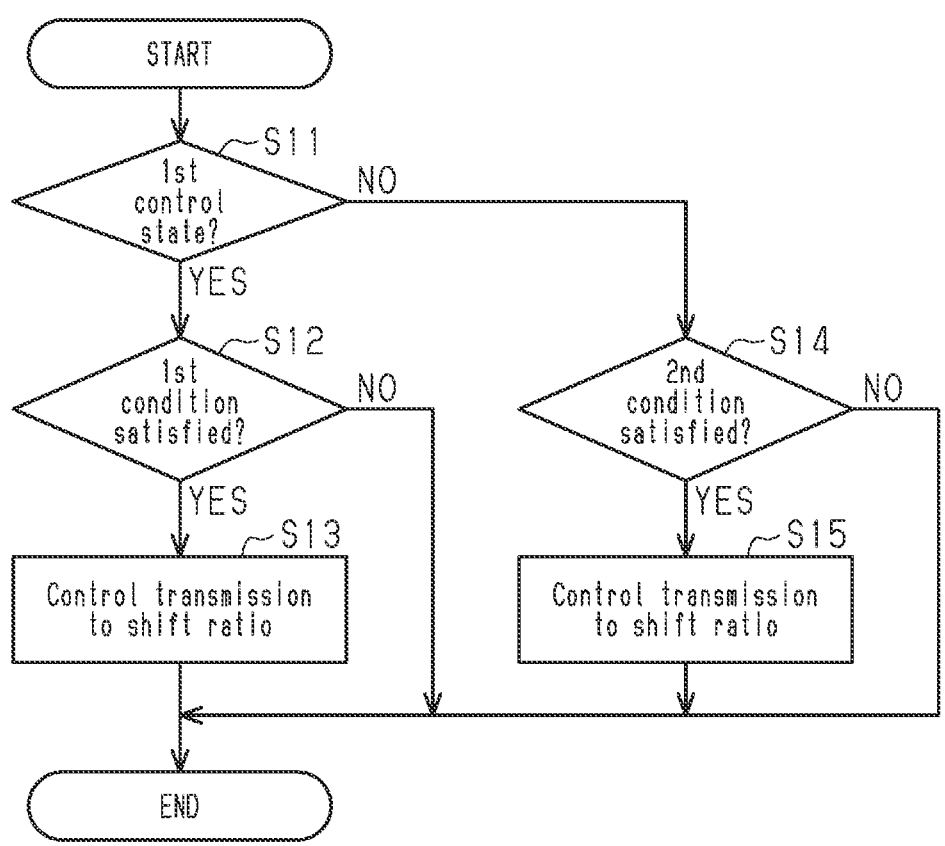
FIG. 3 is a flowchart illustrating a control process executed by an electronic controller of FIG. 2 to control a transmission.

A control process executed by the electronic controller 62 to control the transmission 42 will now be described with reference to FIG. 3. For example, in a case where electric power is supplied to the electronic controller 62, the electronic controller 62 starts the process of the flowchart shown in FIG. 3 from step S11. In a case where the process of the flowchart shown in FIG. 3 ends, the electronic controller 62 repeats the process from step S11 in predetermined cycles until, for example, the supply of electric power stops.

In step S11, the electronic controller 62 determines whether the control state is the first control state. In a case where the control state is the first control state, the electronic controller 62 proceeds to step S12. In step S12, the electronic controller 62 determines whether the first condition is satisfied. In a case where the first condition is not satisfied, the electronic controller 62 ends processing. In a case where the first condition is satisfied, the electronic controller 62 proceeds to step S13. In step S13, the electronic controller 62 controls the transmission 42 to shift the ratio R, and then ends processing.

In a case where the control state is not the first control state in step S11, the electronic controller 62 proceeds to step S14. In step S14, the electronic controller 62 determines whether the second condition is satisfied. In a case where the second condition is not satisfied, the electronic controller 62 ends processing. In a case where the second condition is satisfied, the electronic controller 62 proceeds to step S15. In step S15, the electronic controller 62 controls the transmission 42 to shift the ratio R, and then ends processing.

Figure 4:
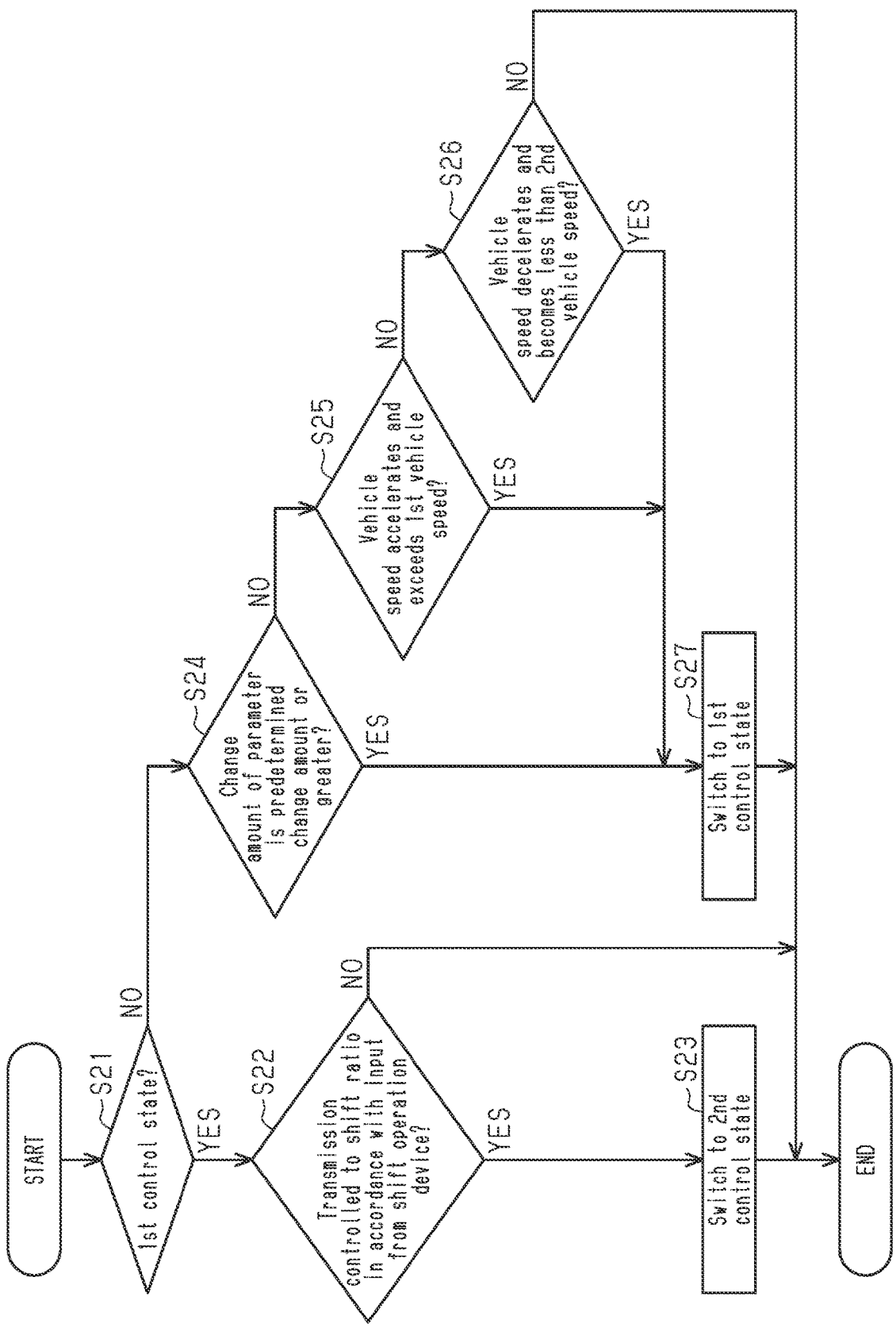
FIG. 4 is a flowchart illustrating a control process executed by the electronic controller of FIG. 2 to switch a control state.

A control process executed by the electronic controller 62 to switch the control state will now be described with reference to FIG. 4. For example, in a case where electric power is supplied to the electronic controller 62, the electronic controller 62 starts the process of the flowchart shown in FIG. 4 from step S21. In a case where the process of the flowchart shown in FIG. 4 ends, the electronic controller 62 repeats the process from step S21 in predetermined cycles until, for example, the supply of electric power stops.

In step S21, the electronic controller 62 determines whether the control state is the first control state. In a case where the control state is the first control state, the electronic controller 62 proceeds to step S22. In step S22, the electronic controller 62 determines whether the transmission 42 is controlled so as to shift the ratio R in accordance with an input from the shift operation device 44. In a case where the ratio R is not shifted in accordance with an input from the shift operation device 44, the electronic controller 62 ends processing. In a case where the ratio R is shifted in accordance with an input from the shift operation device 44, the electronic controller 62 proceeds to step S23. In step S23, the electronic controller 62 switches the control state from the first control state to the second control state. Then, the electronic controller 62 ends processing.

In a case where the control state is not the first control state in step S21, the electronic controller 62 proceeds to step S24. In step S24, the electronic controller 62 determines whether the change amount of the parameter is greater than or equal to the predetermined change amount. In a case where the change amount of the parameter is greater than or equal to the predetermined change amount, the electronic controller 62 proceeds to step S27. In a case where the change amount of the parameter is not greater than or equal to the predetermined change amount, the electronic controller 62 proceeds to step S25.

In step S25, the electronic controller 62 determines whether the vehicle speed accelerates and exceeds the first vehicle speed. In a case where the vehicle speed has accelerated and exceeded the first vehicle speed, the electronic controller 62 proceeds to step S27. In a case where the vehicle speed does not accelerate and does not exceed the first vehicle speed, the electronic controller 62 proceeds to step S26. In step S26, the electronic controller 62 determines whether the vehicle speed decelerates and becomes less than the second vehicle speed. In a case where the vehicle speed does not decelerate and does not become less than the second vehicle speed, the electronic controller 62 ends processing. In a case where the vehicle speed has decelerated and become less than the second vehicle speed, the electronic controller 62 proceeds to step S27. In step S27, the electronic controller 62 switches the control state from the second control state to the first control state. Then, the electronic controller 62 ends processing.

Modifications

The descriptions related to the above embodiment exemplifies, without any intention to limit, an applicable form of a control device for a human-powered vehicle according to the present disclosure. In addition to the embodiment described above, the control device for a human-powered vehicle according to the present disclosure is applicable to, for example, modifications of the above embodiment that are described below and combinations of at least two of the modifications that do not contradict each other. In the modifications described hereafter, same reference numerals are given to those components that are the same as the corresponding components of the above embodiment and such components will not be described in detail.

Figure 5:
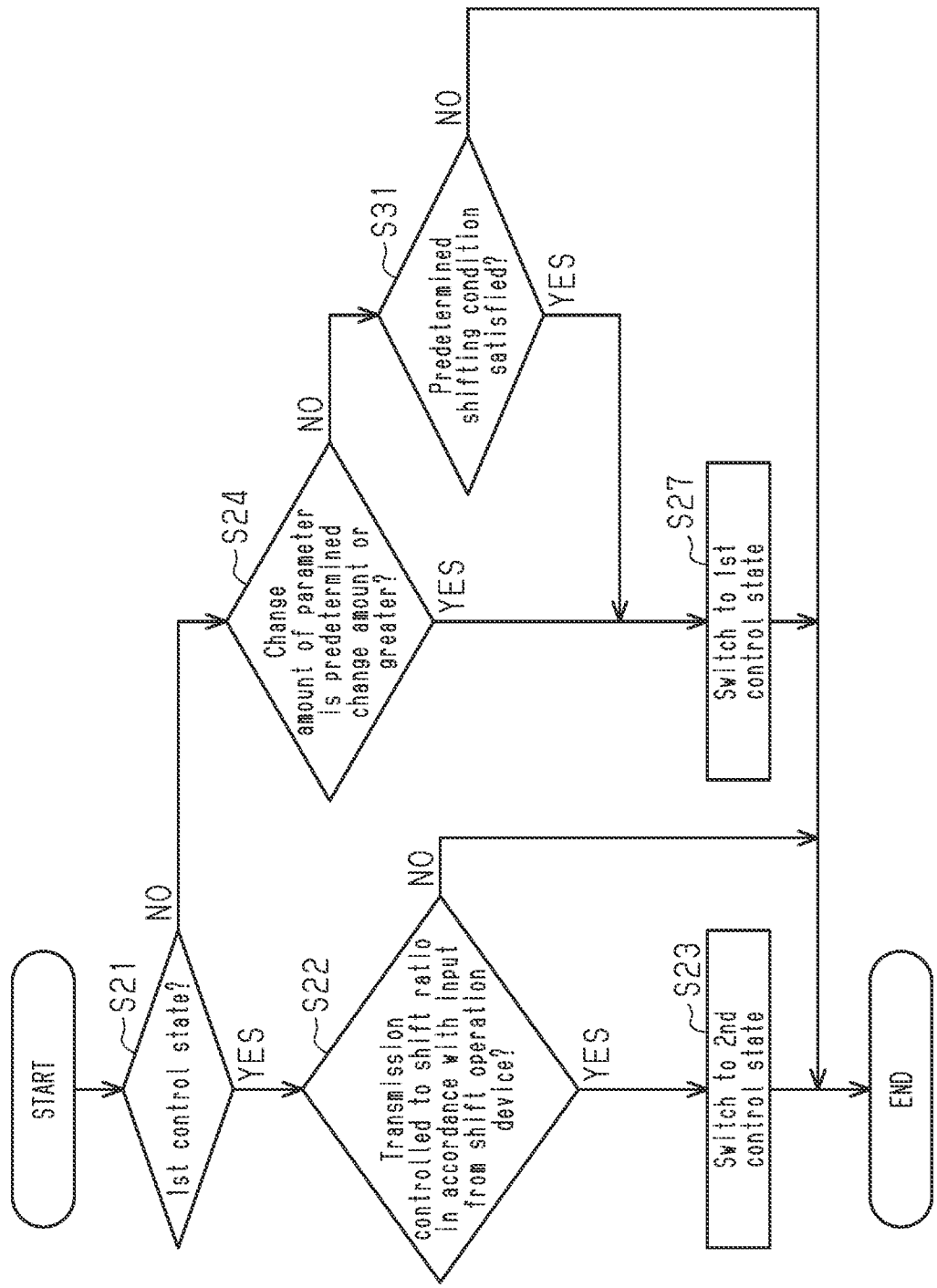
FIG. 5 is a flowchart illustrating a control process executed by an electronic controller in accordance with one modification to switch a control state.

In example in which a case where a predetermined shifting condition that differs from the shifting condition is satisfied in the second control state, the electronic controller 62 is configured to switch the control state from the second control state to the first control state. For example, the predetermined shifting condition is more difficult to satisfy than the shifting condition. The predetermined shifting condition includes, for example, at least one of the rotational speed of the crank axle 12, human driving force, and vehicle speed. In the present embodiment, the predetermined shifting condition includes the rotational speed of the crank axle 12. The predetermined shifting condition is specified by a detection value of the same type as the shifting condition, and the range included in the predetermined shifting condition differs from the range included in the shifting condition. The electronic controller 62 can shift the ratio R in a case where the predetermined shifting condition is satisfied. Alternatively, the electronic controller 62 does not have to shift the ratio R in a case where the predetermined shifting condition is satisfied. For example, instead of steps S25 and S26 of FIG. 4, the electronic controller 62 executes step S31 of FIG. 5. In FIG. 5, in a case where a negative determination is given in step S24, the electronic controller 62 proceeds to step S31. In step S31, the electronic controller 62 determines whether the predetermined shifting condition is satisfied. In a case where the predetermined shifting condition is satisfied, the electronic controller 62 proceeds to step S27. In a case where the predetermined shifting condition is not satisfied, the electronic controller 62 ends processing. The electronic controller 62 can execute step S31 of FIG. 5 in addition to steps S25 and S26 of FIG. 4. For example, the electronic controller 62 is configured to switch the control state from the second control state to the first control state in a case where an affirmative determination is given in any of steps S24, S25, S26, and S31.

In a case where the electronic controller 62 controls the transmission 42 so as to shift the ratio R in accordance with an input from the shift operation device 44 in the first control state, the electronic controller 62 is configured to switch the control state from the first control state to the second control state. Further, in at least one of a case where the vehicle speed accelerates and exceeds the first vehicle speed and a case where the vehicle speed decelerates and becomes less than the second vehicle speed in the second control state, the electronic controller 62 can be configured to switch the control state from the second control state to the first control state. For example, step S24 of FIG. 4 can be omitted. In a case where step S24 is omitted in FIG. 4, if a negative determination is given in step S21, the electronic controller 62 proceeds to step S25.

In a case where the electronic controller 62 controls the transmission 42 so that the ratio R is shifted in one of an increasing manner and a decreasing manner in accordance with an input from the shift operation device 44 in the first control state, shifting of the ratio R in the one of the increasing manner and the decreasing manner in accordance with the shifting condition can be more restricted in the second control state than in the first control state. In an example in which the electronic controller 62 controls the transmission 42 so that the ratio R is shifted in an increasing manner in accordance with an input from the shift operation device 44 in the first control state, shifting of the ratio R in the increasing manner in accordance with the shifting condition is more restricted in the second control state than the first control state. In an example in which the electronic controller 62 controls the transmission 42 so that the ratio R is shifted in a decreasing manner in accordance with an input from the shift operation device 44 in the first control state, shifting of the ratio R in the decreasing manner in accordance with the shifting condition is more restricted in the second control state than the first control state. In the present modification, after the ratio R is shifted in one of an increasing manner and a decreasing manner in accordance with an input from the shift operation device 44, shifting of the ratio R in the one of the increasing manner and the decreasing manner in accordance with the shifting condition is restricted. Thus, the rider can easily set the intended ratio R. This controls transmission 42 in a preferred manner.

The phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

What is claimed is:

1. A control device for a human-powered vehicle, the control device comprising:
    an electronic controller configured to control a transmission that shifts a ratio of a rotational speed of a wheel of the human-powered vehicle to a rotational speed of a crank axle of the human-powered vehicle in accordance with a control state, wherein:
    the electronic controller is configured to select the control state from either one of a first control state and a second control state;
    the electronic controller is configured to control the transmission so that the transmission shifts the ratio in accordance with a shifting condition and an input from a shift operation device that is operable by a user;
    in a case where the electronic controller controls the transmission so as to shift the ratio in accordance with an input from the shift operation device in the first control state, the electronic controller is configured to switch the control state from the first control state to the second control state;
    in a case where a change amount of a parameter related to a vehicle state of the human-powered vehicle becomes greater than or equal to a predetermined amount in the second control state, the electronic controller is configured to switch the control state from the second control state to the first control state; and
    shifting of the ratio in accordance with the shifting condition is more restricted in the second control state than the first control state.

2. The control device according to claim 1, wherein the parameter includes at least one of a vehicle speed and an acceleration of the vehicle speed.

3. The control device according to claim 1, wherein:
    the parameter includes a rotational amount of the crank axle; and
    the predetermined amount includes a predetermined rotational amount set in accordance with the ratio.

4. The control device according to claim 1, wherein the parameter includes a gradient of a road traveled by the human-powered vehicle.

5. The control device according to claim 1, wherein the parameter includes a human driving force input to the human-powered vehicle.

6. The control device according to claim 1, wherein the parameter includes at least one of a rotational amount of the wheel of the human-powered vehicle and a distance traveled by the human-powered vehicle.

7. The control device according to claim 1, wherein the parameter includes the rotational speed of the crank axle.

8. The control device according to claim 1, wherein in at least one of a case where a vehicle speed accelerates and exceeds a first vehicle speed and a case where the vehicle speed decelerates and becomes less than a second vehicle speed in the second control state, the electronic controller is configured to switch the control state from the second control state to the first control state.

9. The control device according to claim 1, wherein in a case where a predetermined shifting condition that differs from the shifting condition is satisfied in the second control state, the electronic controller is configured to switch the control state from the second control state to the first control state.

10. The control device according to claim 1, wherein the shifting condition is related to at least one of a traveling state of the human-powered vehicle and a traveling environment of the human-powered vehicle.

11. The control device according to claim 1, wherein the shifting condition includes at least one of the rotational speed of the crank axle, a human driving force input to the human-powered vehicle, and a vehicle speed.

12. The control device according to claim 1, wherein:
    the shifting condition includes the rotational speed of the crank axle;
    the electronic controller is configured to control the transmission so that the transmission increases the ratio in a case where the rotational speed of the crank axle is greater than an upper limit threshold value; and the electronic controller is configured to control the transmission so that the transmission decreases the ratio in a case where the rotational speed of the crank axle is less than a lower limit threshold value.

13. The control device according to claim 1, wherein:

in a case where the electronic controller controls the transmission so that the ratio is shifted in one of an increasing manner and a decreasing manner in accordance with an input from the shift operation device in the first control state, the electronic controller is configured to switch the control state from the first control state to the second control state; and shifting of the ratio in the other one of the increasing manner and the decreasing manner in accordance with the shifting condition is more restricted in the second control state than the first control state.

14. A control device for a human-powered vehicle, the control device comprising:

an electronic controller configured to control a transmission that shifts a ratio of a rotational speed of a wheel of the human-powered vehicle to a rotational speed of a crank axle of the human-powered vehicle in accordance with a control state, wherein:

the electronic controller is configured to select the control state from either one of a first control state and a second control state;

the electronic controller is configured to control the transmission so that the transmission shifts the ratio in accordance with a shifting condition and an input from a shift operation device that is operable by a user;

in a case where the electronic controller controls the transmission so as to shift the ratio in accordance with an input from the shift operation device in the first control state, the electronic controller is configured to switch the control state from the first control state to the second control state;

in at least one of a case where a vehicle speed accelerates and exceeds a first vehicle speed and a case where the vehicle speed decelerates and becomes less than a second vehicle speed in the second control state, the electronic controller is configured to switch the control state from the second control state to the first control state; and shifting of the ratio in accordance with the shifting condition is more restricted in the second control state than the first control state.

15. The control device according to claim 14, wherein the shifting condition is related to at least one of a traveling state of the human-powered vehicle and a traveling environment of the human-powered vehicle.

16. The control device according to claim 14, wherein the shifting condition includes at least one of the rotational speed of the crank axle, a human driving force input to the human-powered vehicle, and a vehicle speed.

17. The control device according to claim 14, wherein:

the shifting condition includes the rotational speed of the crank axle;

the electronic controller is configured to control the transmission so that the transmission increases the ratio in a case where the rotational speed of the crank axle is greater than an upper limit threshold value; and the electronic controller is configured to control the transmission so that the transmission decreases the ratio in a case where the rotational speed of the crank axle is less than a lower limit threshold value.

18. The control device according to claim 14, wherein:

in a case where the electronic controller controls the transmission so that the ratio is shifted in one of an increasing manner and a decreasing manner in accordance with an input from the shift operation device in the first control state, the electronic controller is configured to switch the control state from the first control state to the second control state; and shifting of the ratio in the other one of the increasing manner and the decreasing manner in accordance with the shifting condition is more restricted in the second control state than the first control state.

* * * * *